(12) United States Patent
Albalawi et al.

(10) Patent No.: US 11,013,288 B2
(45) Date of Patent: May 25, 2021

(54) INTEGRATED WIRELESS HEAD PROTECTION GARMENT AND HARNESS

(71) Applicant: WAKECAP TECHNOLOGIES INC., Sanford, NC (US)

(72) Inventors: Hassan Fahad Albalawi, Tabuk (SA); Roy Gilsing, Rotterdam (NL); Reinier Jean Wassenburg, Rotterdam (NL); Rami Nassouh, Koura (LB)

(73) Assignee: WAKECAP TECHNOLOGIES, INC., Sanford, NC (US)

( * ) Notice: Subject to any disclaimer, the term of this patent is extended or adjusted under 35 U.S.C. 154(b) by 355 days.

(21) Appl. No.: 16/153,912

(22) Filed: Oct. 8, 2018

(65) Prior Publication Data

US 2019/0133239 A1    May 9, 2019

Related U.S. Application Data

(60) Provisional application No. 62/581,781, filed on Nov. 6, 2017.

(51) Int. Cl.
*A42B 3/30* (2006.01)
*H04B 1/3827* (2015.01)
*A42B 3/14* (2006.01)

(52) U.S. Cl.
CPC .................. *A42B 3/30* (2013.01); *A42B 3/14* (2013.01); *H04B 1/385* (2013.01); *H04B 2001/3866* (2013.01)

(58) Field of Classification Search
CPC .............. A42B 3/30; A42B 3/14; H04B 1/385
USPC ............................................................ 2/410
See application file for complete search history.

(56) References Cited

U.S. PATENT DOCUMENTS

| 2012/0304365 A1* | 12/2012 | Howard | A42B 3/046 2/410 |
| 2014/0189937 A1* | 7/2014 | Pietrzak | A42B 3/042 2/411 |
| 2014/0364772 A1* | 12/2014 | Howard | A61B 5/6803 600/595 |
| 2016/0050998 A1* | 2/2016 | Hill | A42B 3/044 2/410 |

* cited by examiner

Primary Examiner — Gloria M Hale
(74) Attorney, Agent, or Firm — Patent Law Works LLP

(57) ABSTRACT

Disclosed is an integrated wireless head protection garment and harness, to a head protection garment and harness with an integrated wireless communication device including a head garment for wearing by a wearer, a harness attached to the head garment, and a wireless communication device attached to the harness. The wireless communication device includes a casing that houses a micro-processing unit and a wireless module along with a depressible button. Depression of the depressible button by the wearer initiates communication of sensor data including at least an event signal to another device by means of the micro-processing unit and the wireless module over a wireless communication network. The micro-processing unit and the wireless module facilitate 2-way communication with the wearer of the wireless communication device.

15 Claims, 4 Drawing Sheets

INTEGRATED WIRELESS HEAD PROTECTION GARMENT AND HARNESS

CROSS-REFERENCE TO RELATED APPLICATIONS

This application claims the benefit of U.S. Provisional Application Ser. No. 62/581,781 filed on Nov. 6, 2017, hereby incorporated by reference.

FIELD OF THE INVENTION

The present invention relates generally to a head protection garment and harness, and, more particularly, to an integrated wireless head protection garment and harness, or to a head protection garment and harness with an integrated wireless communication device in the harness.

BACKGROUND

Generally, individuals, who are working in various industries, are required to wear head protection garments, otherwise head injuries may be sustained. For example, in many industrial working environments, such as mining, power, construction, and forestry, the risk of head injury to the individuals is constantly present. The most serious risks are physical injuries, which can be as a result of the impact of a falling object or collision with fixed or moving objects at the workplaces. Due to the nature of these work activities, it is not always possible to eliminate such risks with just appropriate organizational solutions or collective protective equipment. Therefore, the only way to ensure the safety of the individuals is by using safety helmets. The type of helmet will depend on the specific nature of the physical risks that have been identified in the risk assessment undertaken for the activity.

Even though the use of the safety helmets by the individuals at these workplaces has increased tremendously due to the compulsory implementation of the standardized governing guidelines, various types of on-site incidents at these workplaces are on the rise resulting in loss of lives and properties. One of the main reasons for such incidents is lack of proper communication among various workers and/or with an external entity. With poor communication, the workers end up going to the workplaces that are not suitable for working and hence get trapped, resulting into fatal accidents. Furthermore, due to the lack of timely communication, the external entity fails to facilitate timely rescue operations or medical treatment that may cause loss of lives (or life-long disabilities) and properties. Even if the rescue team reaches the incident location, it becomes a hefty challenge for the rescue team to find the exact location of each individual. In one solution currently being used at these workplaces where multiple individuals wearing head protection garments are present in a defined location, the standard approach to monitor the attendance, location, and safety of these individuals is to rely on each garment wearer to carry mobile devices such as pagers, mobile phones, or other communication devices about their body. However, communication with multiple mobile devices across a defined location presents difficulties for site management due to the need to supply mobile devices to every individual on site, ensure the mobile devices are retained in personal contact at all times, and also the provision of location wide communication to all, or selection, of mobile devices.

Few references were located describing the safety of the individuals working at such locations. For example, U.S. patent U.S. Pat. No. 7,298,258 describes about a construction hard hat having electronic circuitry. In this patent, personnel activity at a construction site is tracked using the electronic circuitry included in hard hats worn by personnel at the site. The electronic circuitry monitors the location of the personnel working at the construction site. One or more messages are generated based on the location information and are used to warn the particular personnel that they have entered an unauthorized area at the construction site.

Additionally, U.S. patent application US20090199317 describes about a hard hat involving wireless data transmission. This invention is characterized by a device at which the hard hat is equipped with a transponder which is just an additional device, and in turn, is data connected with several measuring sensors arranged in and at the hard hat. The transponder is also connected with an antenna located in the upper part of the hard hat. This antenna is able to transmit as omnidirectional wave. Thus, the invention has its own limitation of communication.

Further, U.S. patent application US20060057972 describes an adapter for a modular wireless communication device. The invention describes an additional device that is attached to the helmet as a speaking and hearing device. The device is not an integral part of the safety helmet.

Yet another solution disclosed in U.S. patent application US20130265745 describes a light integrated hard hat that includes a protective head covering having a crown and a brim. The invention uses a first mechanism for producing an illumination carried within the casing behind the open window. The invention further uses a second mechanism for supplying electrical power to the illumination producing mechanism, so as to provide a projected focused beam through the open window of the casing. Thus, the invention describes about an additional device for guiding the users.

Furthermore, another identified U.S. patent U.S. Pat. No. 4,942,628 describes a helmet suspension having a ratchet assembly that is adjustable. The assembly has no metal parts and is therefore suitable for use around electricity and electrical apparatus. The invention does not describe about communication among devices or individuals.

Yet another identified U.S. patent application US20090199326 describes about a retractable earplug assembly for a hard hat which is an additional device for the hard hat that provides protection to the individuals against the insalubrious sounds generated at these workplaces.

In light of the foregoing, there exists a need for a technical and more reliable solution that solves the above-mentioned problems and provides a head protection garment and harness with remote communication capability as its integral part that can receive as well as transmit data both individually or as a part of communication network.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

It is an objective of the present invention to provide a head protection garment and harness with remote communication capability that can receive and/or transmit data both individually or as part of a network.

It is an objective of the present invention to provide a wireless communication device that is compatible with harnesses of existing head protection garments. The wireless communication device is configured to communicate with one or more external servers or devices, such as a remote server, a remote control unit, or other wireless communication devices associated with other wearers, either independently or in conjunction with each other, over one or more wireless communication networks such as a Bluetooth network, a wireless infrared communication (IrDA) network, a wireless fidelity (Wi-Fi) network, a light fidelity (Li-Fi) network, a satellite network, the Internet, an infrared (IR) network, and a radio frequency (RF) network.

In the present invention, these objectives are achieved by provision of an integrated wireless head protection garment and harness, having the wireless communication device located in the harness framework. The wireless communication device includes a casing, or housing, with relative upper, side and lower faces defining an internal chamber. The casing houses a micro-processing unit and a wireless module. The casing (or the micro-processing unit) may further include one or more sensors, such as a location sensor, an image sensor, a temperature sensor, a humidity sensor, a bio-medical sensor, or the like, for detecting and measuring one or more related events or parameters.

In one embodiment, an aperture or opening, extends through an upper face and lower faces of the casing and secures in place the ratchet mechanism wherein the microprocessor/wireless module are held within the casing.

In another embodiment, an aperture or opening, extends through the upper face and lower faces of the casing, and houses, or secures in place, a microprocessor/wireless module and ratchet mechanism.

Various objects, features, aspects, and advantages of the present invention will become more apparent from the following detailed description of the embodiments of the invention, along with the accompanying drawings in which like numerals represent like components.

These and other features and advantages of the invention will become apparent from the detailed description below, in light of the accompanying drawings.

BRIEF DESCRIPTION OF THE ACCOMPANYING DRAWINGS

The novel features which are believed to be characteristic of the present disclosure, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this disclosure will now be described by way of example in association with the accompanying drawings in which:

Figure 1:
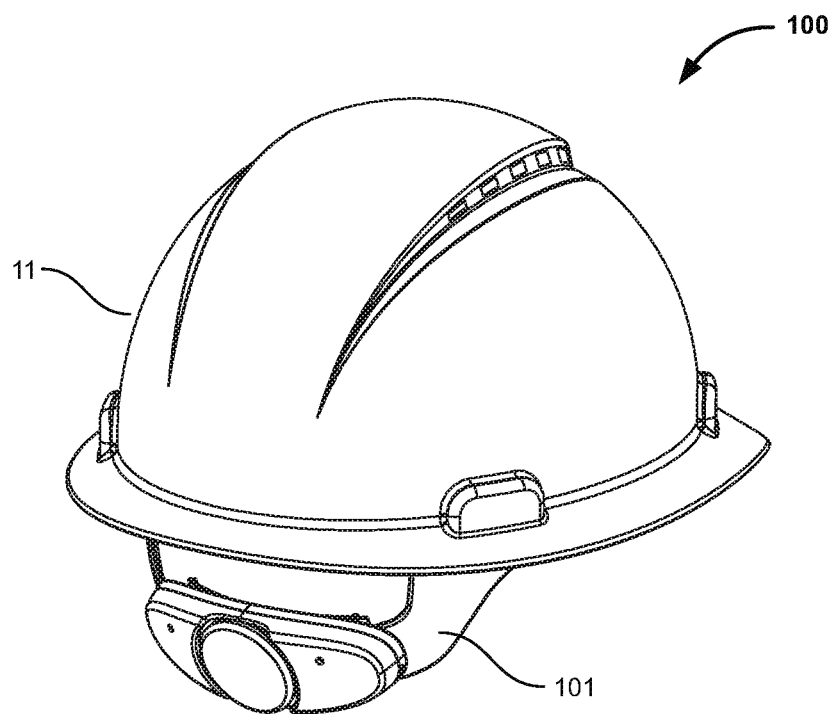
FIG. 1 illustrates a first embodiment of the integrated wireless head protection garment and harness.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of mechanical components, which constitutes an integrated wireless head protection garment and harness with an integrated wireless communication device for facilitating 2-way communication between two or more entities such as workers or devices or servers. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items.

Techniques consistent with the present invention provide, among other features, the integrated wireless head protection garment and harness, to a head protection garment and harness with an integrated wireless communication device in the harness. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

From reading the present disclosure, other variations and modifications will be apparent to persons skilled in the art. Such variations and modifications may involve equivalent and other features which are already known in the art, and which may be used instead of or in addition to features already described herein.

It is understood the term head protection garment and harness is understood to mean any apparel, device or item worn about or on the head of an individual suitable for prevention of damage or injury to the head of the user or wearer.

In one embodiment of the present invention, the head protection garment and harness is a safety helmet. Such safety helmets are typically constructed from an outer plastic shell surrounding a harness with chin and nape straps to maintain the helmet in place on the wearers head.

The integrated wireless head protection garment and harness of the present invention has been described with reference to FIGS. 1-8.

With reference to FIG. 1, shows a first embodiment of the integrated wireless head garment and harness 100 having a head garment 11, a harness 101, and a wireless communication device 10.

The head garment 11 is a hard hat (e.g., a helmet) that is predominantly used in various workplace environments, for example, at industrial or construction sites by workers, to protect their head from injury due to falling objects, impact with other external objects (i.e., the fixed or moving objects), debris, rain, open flame, molten metals splash, electric shock, and high temperature. In general, the head garment 11 should resist penetration by the objects, absorb the shock of a blow, be water resistant and slow burning, and come with instructions explaining proper adjustment and replacement of the suspension and headband. The head garment 11 must be worn by all the workers when performing the construction works, works in the vicinity of lifting equipment (cranes, hoists, etc.) and suspended loads, works in forestry, works in cisterns, wells, shafts, tunnels, or the like. In these situations, the use of the head garment 11 by the workers will help protect against injuries to the scalp, skull, and cervical vertebrae of the workers.

In an embodiment, the head garment 11 includes suspension bands (not shown) inside it. The suspension bands inside the head garment 11 spreads the helmet's weight and the force of any impact over the top of the head. A suspension also provides space between the helmet's shell and the wearer's head, so that if an object strikes the shell, the impact is less likely to be transmitted directly to the skull of the wearer's head. The head garment 11 may also include a mid-line reinforcement ridge to improve upon impact resistance. An outer shell of the head garment 11 is a conventional shell that may be made from hard plastics such as polyvinyls, polyamides, polycarbonates, polyurethanes, or other suitable material without limiting the scope of the present invention. An inner shell of the head garment 11 generally comprises a resilient shock-absorbing material that will protect the wearer's head to the extent possible from the impact of the falling objects, impact with other external objects, debris, rain, and electric shock. Around the lower portion of the head garment 11 is the harness 101. The harness 101 may be a head harness that fits around the circumference of the wearer's head. Generally, the harness 101 has harness suspension straps that provide coverage for the top of the wearer's head. The harness 101 may also be extended to include the wireless communication device 10. The wireless communication device 10 may be attached with the harness 101 such that the wireless communication device 10 is either positioned at the forehead of the wearer, the back head of the wearer, or around the neck of the wearer without limiting the scope of the present invention.

The wireless communication device 10 includes suitable logic, circuitry, and/or interfaces that are operable to execute one or more instructions stored in its memory to perform one or more operations. The operation of the wireless communication device 10 may be dedicated to execution of procedures, such as, but not limited to, instructions, programs, routines, or scripts stored in its memory units for supporting its applied applications. The wireless communication device 10 may be implemented by use of one or more mathematical models, statistical models, and/or algorithms, such as natural-processing techniques and algorithms, image-processing techniques and algorithms, or the like. The wireless communication device 10 may be realized by means of one or more processors, such as, but not limited to, an application-specific integrated circuit (ASIC) processor, a reduced instruction set computing (RISC) processor, a complex instruction set computing (CISC) processor, and a field-programmable gate array (FPGA). The one or more processors may also correspond to central processing units (CPUs), graphics processing units (GPUs), neural processing units (NPUs), digital signal processors (DSPs), or the like. Various functions and operations of the wireless communication device 10 have been described in detail in conjunction with FIGS. 2-5.

Figure 2:
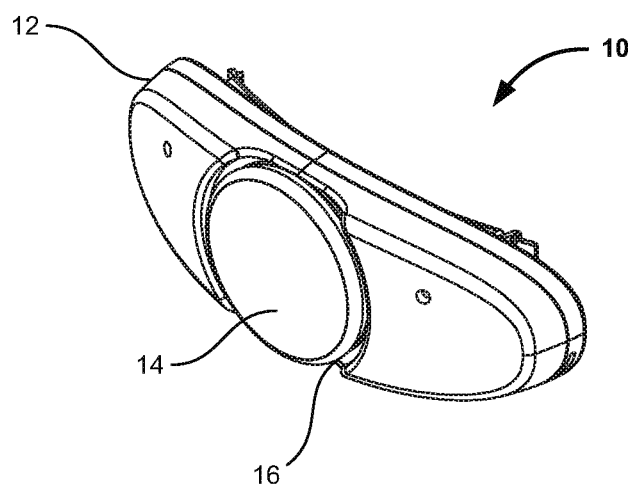
FIGS. 2 and 3 illustrate a front view of the wireless communication device, in accordance with the first embodiment of the present invention.

With reference to FIG. 2, shows the wireless communication device 10 in accordance with the first embodiment of the present invention. The wireless communication device 10 includes a hollow casing, or shell, 12. The casing 12 defines an internal chamber of the wireless communication device 10. It is contemplated that the casing 12 is constructed from at least one of one or more suitable materials selected from plastics, polymers, composites, and metals. In one embodiment, the casing 12 may be constructed from a single molded unit, such as a plastic, a polymer, a composite, or a metal. In another embodiment, the casing 12 may be constructed from two or more interconnecting molded units that are engaged to form the casing 12.

With reference to FIG. 2, the relative upper face, or side, of the casing 12 presents a depressible button 14 embedded in a knob, or support, 16. In another embodiment of the present invention, the button 14 and the knob 16 are independently rotational. In another embodiment, the button 14 may be a push-pull button that is operated to engage or disengage the button 14 from the knob 16. In another embodiment, the button 14 may be a touch-sensitive button with one or more depression thresholds. For example, when the button 14 is depressed to a first depression threshold, a first set of operations may be activated. When the button 14 is depressed to a second depression threshold, a second set of operations may be activated. The first and second sets of operations may be the same or different. Furthermore, various operations include, but are not limited to, engagement or disengagement of the button 14 from the knob 16, activation or deactivation of one or more sensors such as image sensors, proximity sensors, force and pressure sensors, temperature sensors, humidity sensors, location sensors, bio-medical sensors, or the like, and wireless communication of sensed data to a remote server or device, or to other wireless communication devices associated with other wearers associated with the same work place in the same geographical region or different work places in different geographical regions.

Figure 3:
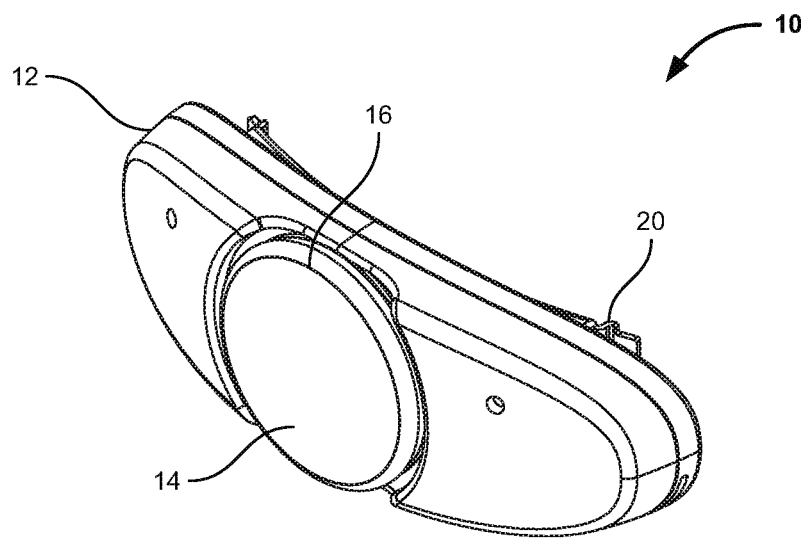
Figure 4:
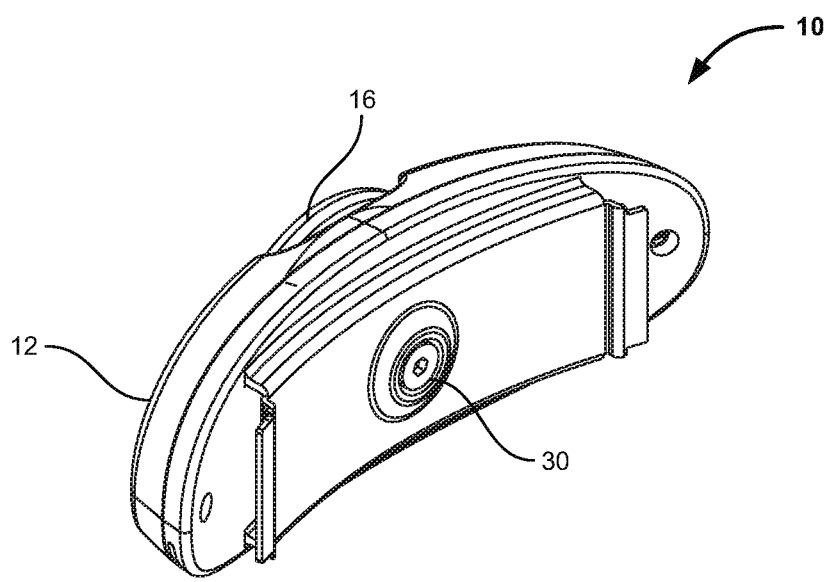
FIG. 4 illustrates a rear view of the wireless communication device, in accordance with the first embodiment of present invention.

With reference to FIGS. 3 and 4, the relative lower face, or side, of the casing 12 presents a longitudinal channel 20. The channel 20 may be suitable for the acceptance of a strap from the protective head garment 11. A securing pin, or screw, 30 embedded through an inner chamber of the wireless communication device 10 from the lower face of the casing 12 retains the button 14, the knob 16, and other internal features in their positions. The internal features of the wireless communication device 10 consistent with the first embodiment of the present invention have been discussed in more detail with reference to exploded view shown in FIG. 5.

Figure 5:
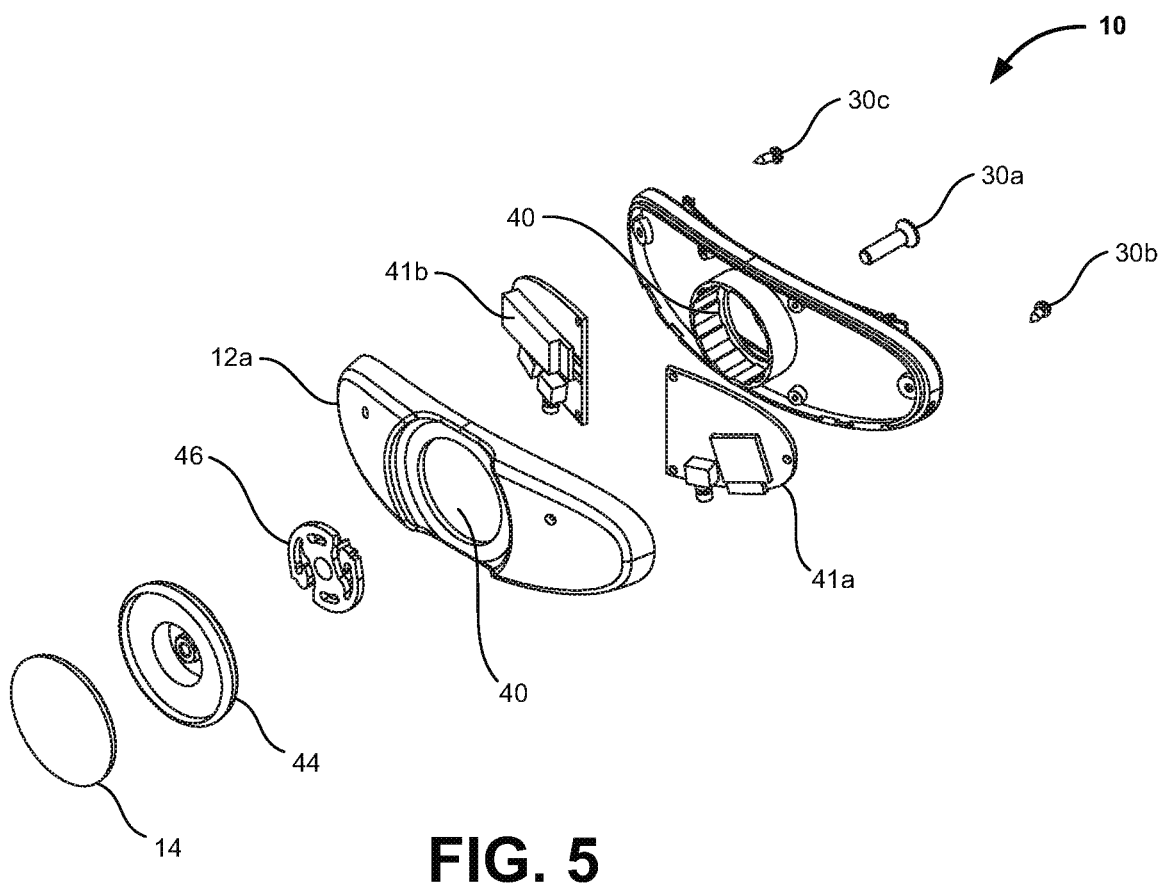
FIG. 5 illustrates an exploded view of the wireless communication device, in accordance with the first embodiment of the present invention.

With reference to FIG. 5, shows a casing upper face 12a having an aperture 40. The aperture 40 is an opening (e.g., a circular, rectangular, square, or any other shaped opening) that extends through the internal chamber of the wireless communication device 10 through to a relative lower face of the casing 12 wherein retaining screws 30a, 30b, and 30c are inserted.

With reference to FIGS. 2-5, the aperture 40 encloses the button 14 and one or more ratchet mechanism parts, such as ratchet mechanism parts 44 and 46. It is contemplated the any suitable ratchet mechanism known in the art can be implement into the mechanical ratchet of the present invention, one such suitable mechanical ratchet mechanism is described in U.S. Pat. No. 4,942,628.

Further, in an embodiment, a battery powered micro-processing unit 41a and a wireless module 41b are housed in the casing 12. The battery powered micro-processing unit 41a and the wireless module 41b are adapted for use on any wireless communication protocol including, but are not limited to, a Bluetooth network, a wireless infrared communication (IrDA) network, a wireless fidelity (Wi-Fi) network, a light fidelity (Li-Fi) network, a satellite network, the Internet, an infrared (IR) network, a radio frequency (RF) network, or any combinations thereof. The battery powered micro-processing unit 41a and the wireless module 41b may connect to a communication network in accordance with various wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, a Zigbee communication protocol, an IrDA communication protocol, or any combination thereof.

The battery powered micro-processing unit 41a and the wireless module 41b provide the wireless communication device 10 with the ability to conduct 2-way communication with the wearer of the wireless communication device 10. Communication between multiple individuals, each wearing the wireless communication device 10 including the various sensors, buzzers, or audio devices (e.g., microphones) embedded therein, on one or more sites or geographical areas and a central/remote control unit (e.g., a remote server, device, or controller) enables improved and faster distribution of real-time information to and about the wearers via the battery powered micro-processing unit 41a and the wireless module 41b and/or optionally via the central control unit/server. The real-time information includes at least real-time position information, collision information, experienced force and pressure information, humidity and temperature information, image and video information of the surrounding environment (may or mayn't include the wearer under consideration), proximity information of each external object, incident information, health information (such as pulse rate, heart rate, breathing state, drowsiness state, stress state, unconscious state, or the like), motion information, and a combination thereof that are associated one or more wearers. The wireless communication device 10 may be integrated with various types of one or more sensors such as the location sensors, proximity sensors, image sensors, temperature sensors, humidity sensors, bio-medical sensors, and pressure sensors. The various types of sensors may be automatically triggered in an event of detection of the incident associated with the wearer or in the vicinity of the wearer. In another embodiment, the wearer may provide a manual input (for example, pressing the button 14 or some other switching element provided along the wireless communication device 10) to trigger the activation of the various types of sensors integrated inside the wireless communication device 10. The wireless communication device 10 may also communicate with one or more fitness wearable devices (such as fitness bands or watches) to receive the appropriate health information such as the pulse rate or the heart rate.

In one embodiment, the battery powered micro-processing unit 41a may process the sensed data to detect the incident, and thereafter determine the criticality of the incident. Based on the criticality of the incident, the battery powered micro-processing unit 41a generates a warning message and communicates it to other workers in the vicinity or to the central control unit/server by means of the wireless module 41b. The central control unit/server may initiate appropriate rescue operations to help the workers. In another embodiment, the workers may take appropriate rescue steps to help themselves in quick time. In another embodiment, the battery powered micro-processing unit 41a may communicate the sensed data to the central control unit/server by means of the wireless module 41b. The central control unit/server may process the sensed data to detect the incident, and thereafter determine the criticality of the incident. Based on the criticality of the incident, the central control unit/server generates a warning message and communicates it to the wearer and/or other workers in the vicinity by means of the wireless module 41b. The warning message may be communicated by means of an audio signal (e.g., an alarm).

In an embodiment, the depression of the button 14 by the wearer (wearing the wireless communication device 10) further initiates an event signal (e.g., an alarm call) which may be transmitted to other device wearers via the battery powered micro-processing unit 41a and the wireless module 41b and/or optionally via the central control unit/server.

Figure 6:
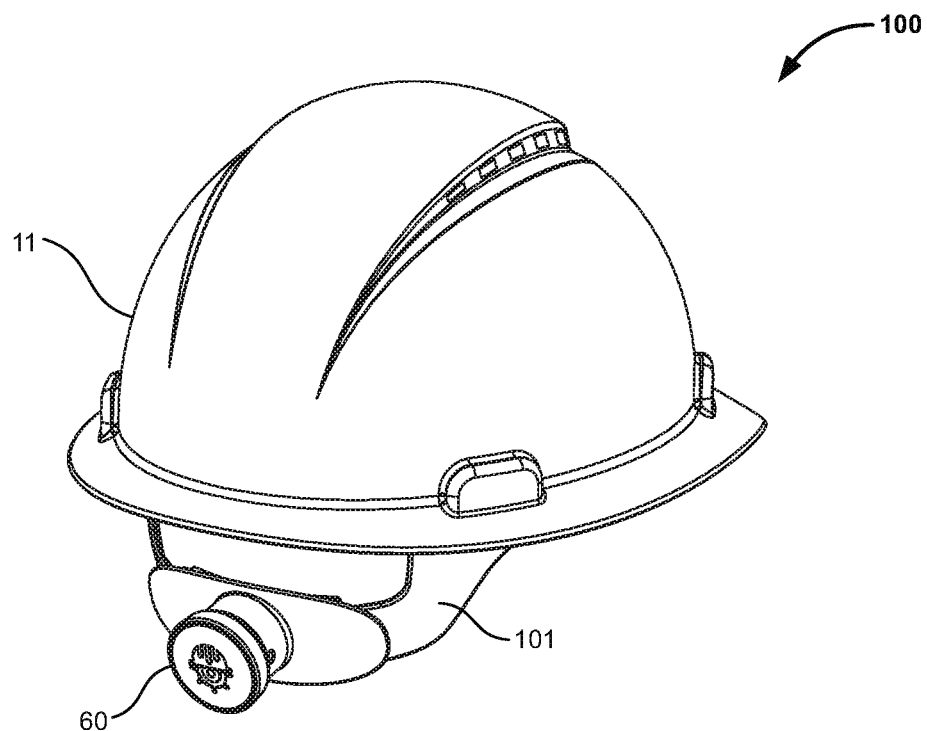
FIG. 6 illustrates a second embodiment of the integrated wireless head protection garment and harness, in accordance with a second embodiment of the present invention.

FIG. 6 illustrates a second embodiment of the integrated wireless safety garment and harness 100, having the head garment 11, the harness 101, and an integrated wireless communication device 60.

Figure 7:
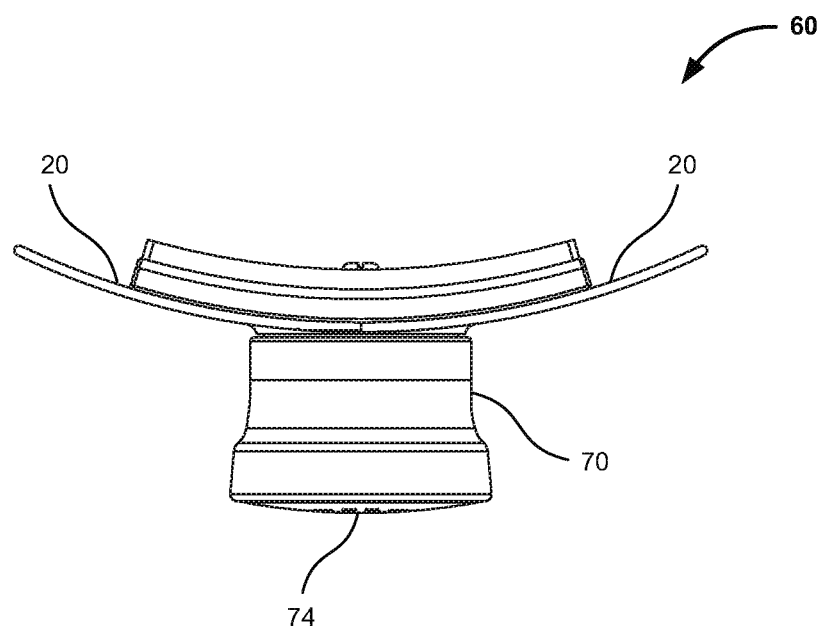
FIG. 7 illustrates a side view of the wireless communication device, in accordance with the second embodiment of the present invention.

With reference to FIG. 7, the features of the integrated wireless communication device 60 are discussed. The wireless communication device 60 is contained in a rotating elongated enclosure 70 having a snap-fit depressible button 74 at one end and supported at a second end by a housing 72 (shown in FIG. 8). The elongate enclosure 70 is held in place by use of retention screw 30a and retention washer 31a. The button 74 may be formed from a suitable flexible plastic or polymer.

Figure 8:
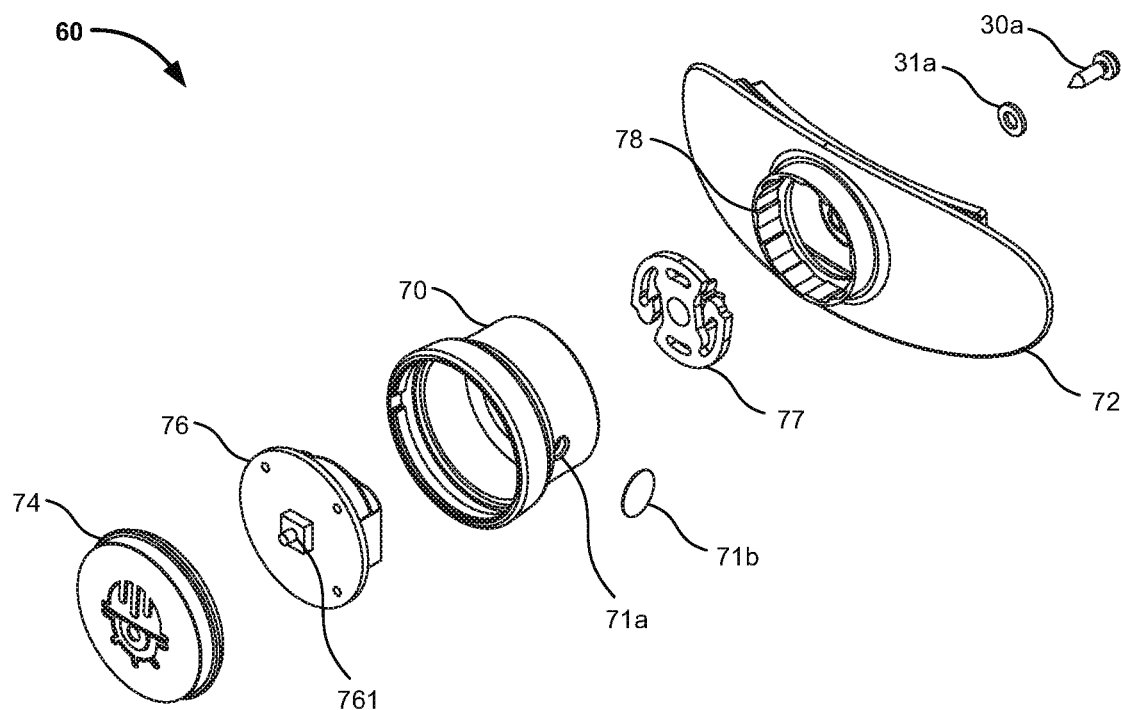
FIG. 8 illustrates an exploded view of the wireless communication device, in accordance with the second embodiment of the present invention.

The functional features of the wireless communication device 60 are further discussed with reference to FIG. 8. An elongated enclosure 70 includes one or more side vent holes (such as a hole 71a and/or a hole 71b). The one or more side vent holes allow the surrounding air to enter the enclosure for an on-board environment measurement and to equalize the inside pressure with the outside pressure. The elongated enclosure 70 and the button 74 also form a dust, water tight seal about the internal features therein, providing suitable protection for internal features use in the construction works, works in the vicinity of lifting equipment (cranes, hoists, etc.) and suspended loads, works in forestry, works in cisterns, wells, shafts, tunnels, or the like.

The button 74 is in reversible engagement with a single micro-processing/wireless module 76 with a contact button 761, housed with the elongated enclosure 70. Ratchet mechanism 77 suitable for engagement with, loosen and tightening of, the harness 101 is held, or located, with an aperture 78 in the housing 72. The ratchet mechanism 77 in combination with the rotational elongated enclosure 70 is turned, or rotated, to tighten or loosen the harness 101 whilst worn about the head of the wearer.

The button 74, constructed from a suitable flexible plastic or polymer, initiates operation of the wireless communication device 60 by a reversible physical contact with the contact button 761 of the micro-processing/wireless module 76 and can be used to request help by sending a message to a supervisor or a safety officer associated with the work location of incident in the construction works, works in the vicinity of lifting equipment (cranes, hoists, etc.) and suspended loads, works in forestry, works in cisterns, wells, shafts, tunnels, or the like. The message may be sent in form of a text, an audio, a video, an image, or the like.

In other scenarios or environments, the button 74 and/or the micro-processing/wireless module 76 may be pushed down by the wearer whilst wearing the harness 100 to confirm the receiving of an evacuation alert signal and to indicate the wearer is executing an emergency action plan.

When the integrated wireless safety garment and harness 100 of the present invention is located inside its associated mesh network, can detect its location within the network and will constantly broadcast this data to its associated gateway.

The integrated wireless safety garment and harness 100 of the present invention when located inside its associated mesh network, can measure the environment temperature and humidity and will constantly broadcast this data to its associated gateway.

The integrated wireless safety garment and harness 100 of the present invention when located inside its associated mesh network, can receive an alarm signal which will cause an internal buzzer to make an alarming sound. The button (cap) can be pushed as a confirmation that the wearer has noticed the alarm signal.

Other information communicated may include wearer location, activity, and safety. It is contemplated that the communication network formed by multiple device wearers across one or more geographical locations will enable the rapid issuing of emergency or evacuation calls and also other logistical messages.

It is contemplated that suitable geographical locations include the construction works, works in the vicinity of lifting equipment (cranes, hoists, etc.) and suspended loads, works in forestry, works in cisterns, wells, shafts, tunnels, or the like. The message may be sent in form of a text, an audio, a video, an image, or the like.

It is contemplated that other embodiments of the wireless communication device further incorporate one or more of the following accelerometers, humidity sensors, device wearer personal information, or identity data.

With reference to FIGS. 1 and 6 illustrate the engagement of the wireless communication devices 10/60 with harness 101 of a safety helmet, or other head protection garment. Thus, the harness 101, in one embodiment, is the nape strap of a standard safety helmet, is held within internal channel 20 such as to engage the strap with the internal ratchet mechanism parts 44/46.

Thus, a key feature of the present invention is the compatibility of the wireless communication devices 10/60 with on-market safety helmets and other head protection garments having suitable harnesses. Such that no modification of the head protection garment, for example the safety helmet harness, is required prior to attachment of the wireless sensor unit 10/60.

Thus, the present invention facilitates modification of the existing technology and integrates the solution into the wireless communication device 10 (by means of the button 14, the knob 16, the micro-processing unit 41a or 76, the wireless module 41b, or a combination thereof). It is the object of the present invention to provide the wireless communication that is effectively and efficiently compatible with harness of the existing head protect garments. The integrated wireless head garment and harness 100 is configured to detect, measure, process, and communicate the various sensed data (such as the incident, location, activity, safety, environmental, and image and video information) to the remote server/control units in wireless manner. It is contemplated that the communication network formed by means of multiple device wearers (thereby creating a mesh network) across one or more geographical regions will enable rapid issuing of the emergency or evacuation calls along with other logistical messages. Further, the micro-processing unit 41*a* or 76, the wireless module 41*b* provides the wireless communication device 10 of the present invention with the ability to conduct the 2-way communication with the wearer. Thus, the communication between the multiple individuals, each wearing the wireless communication device 10 including the various sensors, buzzers, or audio device (e.g., microphones) embedded therein, and the remote server/control unit enables improved and faster distribution of the real-time information among themselves.

Although particular embodiments of the invention have been described in detail for purposes of illustration, various modifications and enhancements may be made without departing from the spirit and scope of the invention.

What is claimed is:

1. An integrated wireless head protection garment and harness, comprising:
    a head garment for wearing by a wearer;
    a harness attached to the head garment; and
    a wireless communication device attached to the harness, the wireless communication device comprising:
        a casing that defines an internal chamber of the wireless communication device and houses a battery powered micro-processing unit and a wireless module; and
        a depressible button embedded in a knob of the wireless communication device, wherein depression of the depressible button by the wearer initiates communication of an event signal to an another device by means of the battery powered micro-processing unit and the wireless module over a wireless communication network, and wherein the battery powered micro-processing unit and the wireless module facilitate 2-way communication with the wearer of the wireless communication device.

2. The integrated wireless head protection garment and harness of claim 1, wherein the harness is a head harness that fits around a circumference of the wearer's head.

3. The integrated wireless head protection garment and harness of claim 1, wherein the casing is constructed from one or more molding units, wherein each molding unit is made of at least one of a plastic, a polymer, a composite, or a metal.

4. The integrated wireless head protection garment and harness of claim 1, wherein the depressible button and the knob are provided on an upper surface of the casing.

5. The integrated wireless head protection garment and harness of claim 4, wherein the depressible button and the knob are independently rotational.

6. The integrated wireless head protection garment and harness of claim 4, wherein the depressible button is a push-pull button that is operated by the wearer to initiate one or more operations including at least one of engagement or disengagement of the depressible button from the knob, activation or deactivation of one or more sensors, and wireless communication of sensed data to the another device.

7. The integrated wireless head protection garment and harness of claim 4, wherein the depressible button is a touch-sensitive button with one or more depression thresholds that is operated by the wearer to initiate one or more operations including at least one of engagement or disengagement of the depressible button from the knob, activation or deactivation of one or more sensors, and wireless communication of sensed data to the another device.

8. The integrated wireless head protection garment and harness of claim 7, wherein the one or more sensors include at least one of a location sensor, a proximity sensor, an image sensor, a temperature sensor, a humidity sensor, a bio-medical sensor, and a pressure sensor.

9. The integrated wireless head protection garment and harness of claim 1, further comprising a securing pin that is embedded through an inner chamber of the wireless communication device from a lower face of the casing to retain at least the depressible button and the knob in their positions.

10. The integrated wireless head protection garment and harness of claim 1, wherein an upper face of the casing includes an aperture that extends through an internal chamber of the wireless communication device through to a lower face of the casing where one or more retaining screws are inserted.

11. The integrated wireless head protection garment and harness of claim 10, wherein the aperture encloses the depressible button along with one or more ratchet mechanism parts.

12. The integrated wireless head protection garment and harness of claim 1, wherein the battery powered micro-processing unit and the wireless module are adapted for use over the wireless communication network including at least one of a Bluetooth network, a wireless infrared communication (IrDA) network, a wireless fidelity (Wi-Fi) network, a light fidelity (Li-Fi) network, a satellite network, the Internet, an infrared (IR) network, and a radio frequency (RP) network.

13. The integrated wireless head protection garment and harness of claim 1, wherein the battery powered micro-processing unit and the wireless module facilitate communication of real-time information including at least the event signal to one or more other wearers wearing a same type of harnessing devices, wherein the event signal indicates a message in form of at least one of a text, an audio, a video, and an image.

14. The integrated wireless head protection garment and harness of claim 13, wherein the real-time information includes at least one of real-time position information, collision information, experienced force and pressure information, humidity and temperature information, image and video information of a surrounding environment, proximity information of each external object, incident information, health information, and motion information.

15. The integrated wireless head protection garment and harness of claim 14, wherein communication between multiple wearers, each wearing a same type of wireless communication devices including one or more sensors embedded therein, on one or more geographical regions and the another device enables faster distribution of the real-time information to and about the multiple wearers via one or more of (a) the battery powered micro-processing unit and the wireless module and (b) the another device, wherein the another device corresponds to at least a remote server or a central control unit that is communicatively connected to each wireless communication device over the wireless communication network.

* * * * *